(12) United States Patent
Mori

(10) Patent No.: US 8,102,912 B2
(45) Date of Patent: Jan. 24, 2012

(54) IMAGE PROCESSING DEVICE AND COMPUTER TERMINAL, AND SIGNAL SEPARATION METHOD

(75) Inventor: Hirofumi Mori, Koganei (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 412 days.

(21) Appl. No.: 12/478,093

(22) Filed: Jun. 4, 2009

(65) Prior Publication Data

US 2010/0067572 A1 Mar. 18, 2010

(30) Foreign Application Priority Data

Sep. 17, 2008 (JP) ................................ 2008-238333

(51) Int. Cl.
*H04N 7/12* (2006.01)
*H04N 11/02* (2006.01)
*H04N 11/04* (2006.01)
(52) U.S. Cl. .................................. 375/240.01; 382/259
(58) Field of Classification Search ............. 375/240.01; 382/259
See application file for complete search history.

(56) References Cited

U.S. PATENT DOCUMENTS
7,558,318 B2 * 7/2009 Okada et al. ............. 375/240.01
2004/0261123 A1 * 12/2004 Yamada et al. ............... 725/131

FOREIGN PATENT DOCUMENTS
JP 2008-027221 A 2/2008

* cited by examiner

*Primary Examiner* — Christopher S Kelley
*Assistant Examiner* — Thoai Nguyen
(74) *Attorney, Agent, or Firm* — Holtz, Holtz, Goodman & Chick, P.C.

(57) ABSTRACT

An image processing device includes a determination unit configured to determine a correlation value between a decoded frame and a reference frame and the number of iterations indicating the number of times signal separation calculation based on a TV method is iteratively performed on the decoded frame, based on a result of a motion search process, a generation unit configured to generate, as an initial gradient signal value, a zero vector or a gradient signal value obtained based on a motion vector determined in the motion search process, according to the correlation value, and a separation unit configured to iteratively perform the signal separation calculation on the decoded frame the number of iterations, using the initial gradient signal value as an initial value, and separate the decoded frame into a skeleton image signal and a texture image signal.

11 Claims, 6 Drawing Sheets

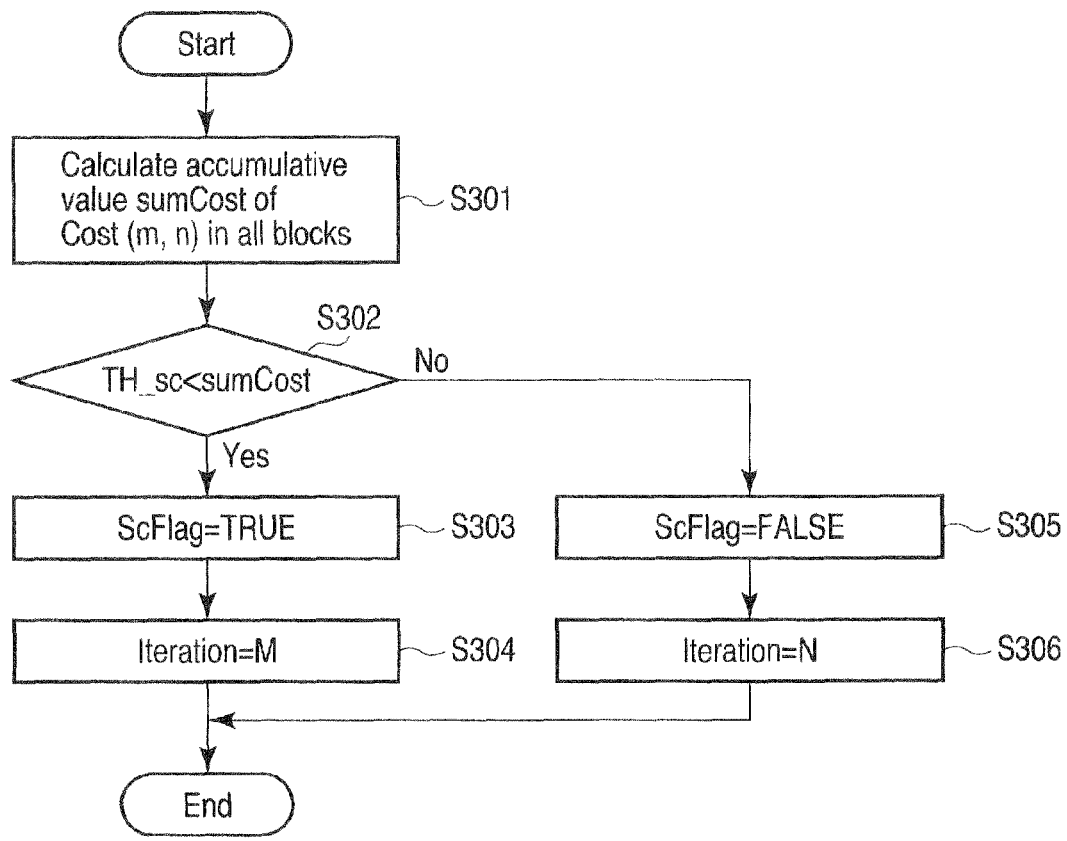
F I G. 4
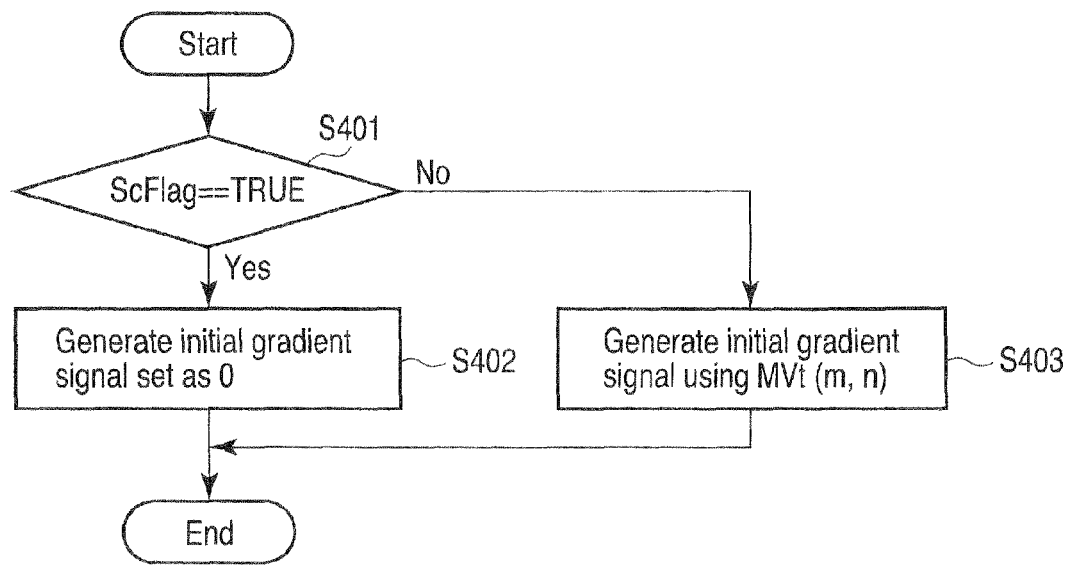
F I G. 5

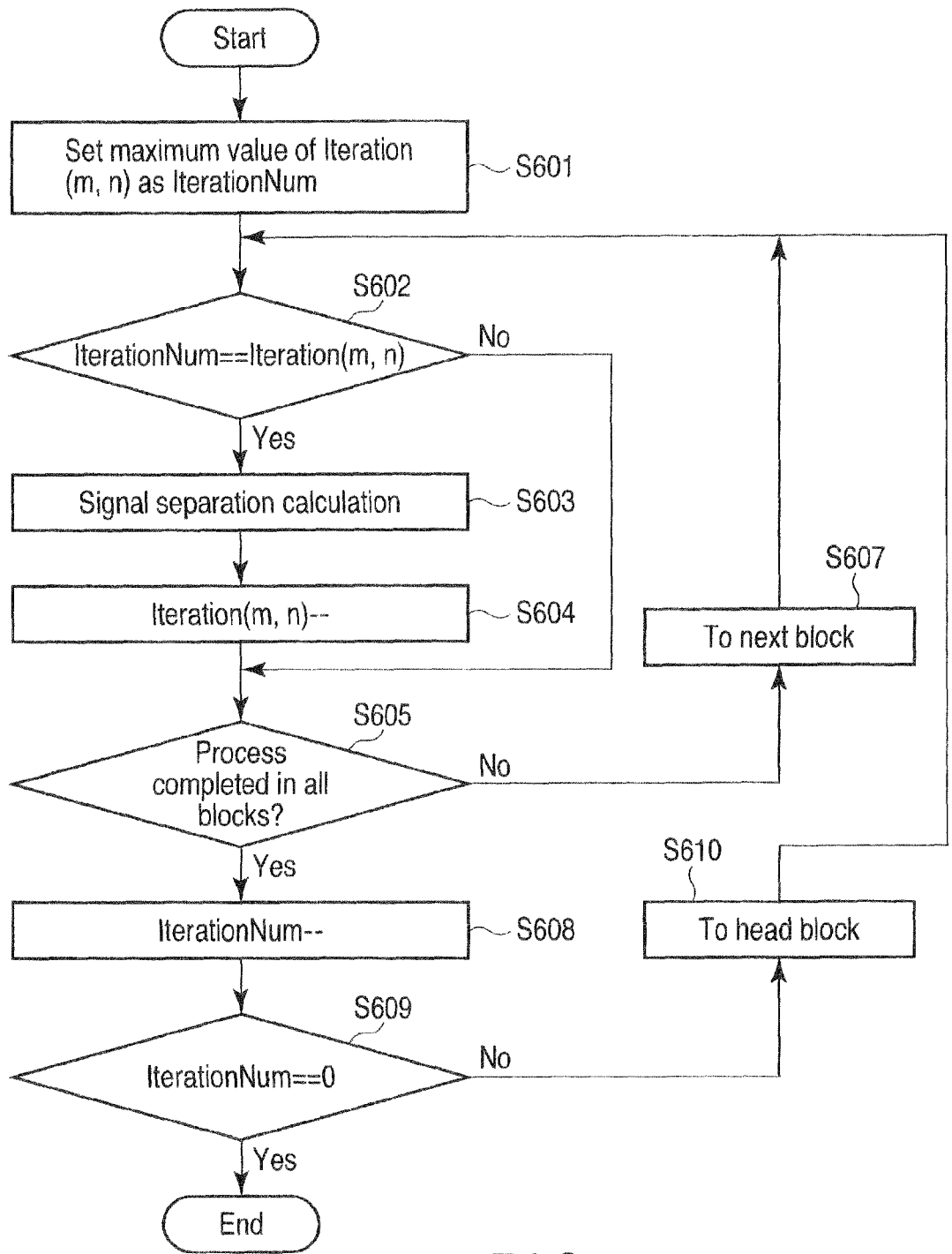
F I G. 7

IMAGE PROCESSING DEVICE AND COMPUTER TERMINAL, AND SIGNAL SEPARATION METHOD

CROSS-REFERENCE TO RELATED APPLICATIONS

This application is based upon and claims the benefit of priority from prior Japanese Patent Application No. 2008-238333, filed Sep. 17, 2008, the entire contents of which are incorporated herein by reference.

BACKGROUND OF THE INVENTION

1. Field of the Invention

The present invention relates to separation calculation of frames forming a motion picture based on a total variation (TV) method.

2. Description of the Related Art

In the past, a known approach for separating frames forming a motion picture has been a TV method. When signal separation calculation is performed on a frame based on the TV method, the frame is separated into a skeleton signal component and a texture (variation) signal component.

JP-A 2008-27221 (KOKAI), for example, discloses a technique for separating an original image into a skeleton image u and a texture image v based on the TV method and determining a motion vector based on the skeleton image u.

The TV method is a non-linear optimization technique which employs an iteration process, in which a value obtained empirically/experimentally is often set as the number of iterations. When the process is performed on frames forming a motion picture based on the TV method, however, the accuracy of signal separation is difficult to maintain unless an appropriate initial value is set, even if the number of iterations (calculation amount) is decreased. JP-A 2008-27221 (KOKAI) describes an image processing device based on a TV method, but does not discuss what initial value is appropriate.

BRIEF SUMMARY OF THE INVENTION

According to an aspect of the invention, there is provided an image processing device comprising: a decoder which decodes a coded stream into which a coded frame is multiplexed and obtains a decoded frame; a storage unit configured to store a reference frame; a motion search unit configured to perform a motion search process on the decoded frame and determine a motion vector between the decoded frame and the reference frame stored in the storage unit; a determination unit configured to determine a correlation value between the decoded frame and the reference frame and the number of iterations indicating the number of times signal separation calculation based on a TV method is iteratively performed on the decoded frame, based on a result of the motion search process; a generation unit configured to generate, as an initial gradient signal value, a zero vector or a gradient signal value obtained based on the motion vector determined in the motion search process, according to the correlation value; a separation unit configured to iteratively perform the signal separation calculation on the decoded frame the number of iterations, using the initial gradient signal value as an initial value, and separate the decoded frame into a first skeleton image signal and a first texture image signal; an image processing unit configured to perform at least one of an edge enhancement process on the first skeleton image signal and a noise suppression process on the first texture image signal and obtain a second skeleton image signal and a second texture image signal; and a combination unit configured to combine the second skeleton image signal and the second texture image signal to generate a frame to be output.

According to another aspect of the invention, there is provided a computer terminal comprising: a storage unit; a processor which operates as: means for decoding a coded stream into which a coded frame is multiplexed and obtaining a decoded frame; means for storing a reference frame in the storage unit; means for performing a motion search process on the decoded frame and determining a motion vector between the decoded frame and the reference frame stored in the storage unit; means for determining a correlation value indicating strength of correlation between the decoded frame and the reference frame, and the number of iterations indicating the number of times signal separation calculation based on a TV method is performed on the decoded frame, based on a result of the motion search process; means for generating a zero vector or a gradient signal value obtained based on the motion vector determined in the motion search process as an initial gradient signal value, according to the correlation value; means for iteratively performing the signal separation calculation on the decoded frame the number of iterations using the initial gradient signal value as an initial value, and separating the decoded frame into a first skeleton image signal and a first texture image signal; means for performing at least one of an edge enhancement process on the first skeleton image signal and a noise suppression process on the first texture image signal and obtaining a second skeleton image signal and a second texture image signal; and means for combining the second skeleton image signal and the second texture image signal and generating a frame to be output, and a display unit configured to display the frame to be output.

According to another aspect of the invention, there is provided a signal separation method comprising: decoding a coded stream into which a coded frame is multiplexed and obtaining a decoded frame; performing a motion search process on the decoded frame and determining a motion vector between the decoded frame and a reference frame; determining occurrence or nonoccurrence of scene change between the decoded frame and the reference frame; determining the number of iterations indicating the number of times signal separation calculation based on a TV method is iteratively performed on the decoded frame, based on the occurrence or nonoccurrence of the scene change; generating, as an initial gradient signal value, a zero vector or a gradient signal value obtained based on the motion vector determined in the motion search process, according to the occurrence or nonoccurrence of the scene change; and iteratively performing the signal separation calculation on the decoded frame the number of iterations, using the initial gradient signal value as an initial value, and separating the decoded frame into a skeleton image signal and a texture image signal.

BRIEF DESCRIPTION OF THE SEVERAL VIEWS OF THE DRAWING

FIG. 4 is a flowchart showing a determination process of a calculation parameter according to the first embodiment.

FIG. 5 is a flowchart showing a generation process of a gradient signal value according to the first embodiment.

FIG. 7 is a flowchart showing signal separation calculation according to a third embodiment.

DETAILED DESCRIPTION OF THE INVENTION

Hereinafter, embodiments of the present invention will now be described with reference to the accompanying drawings.

First Embodiment

Figure 2:
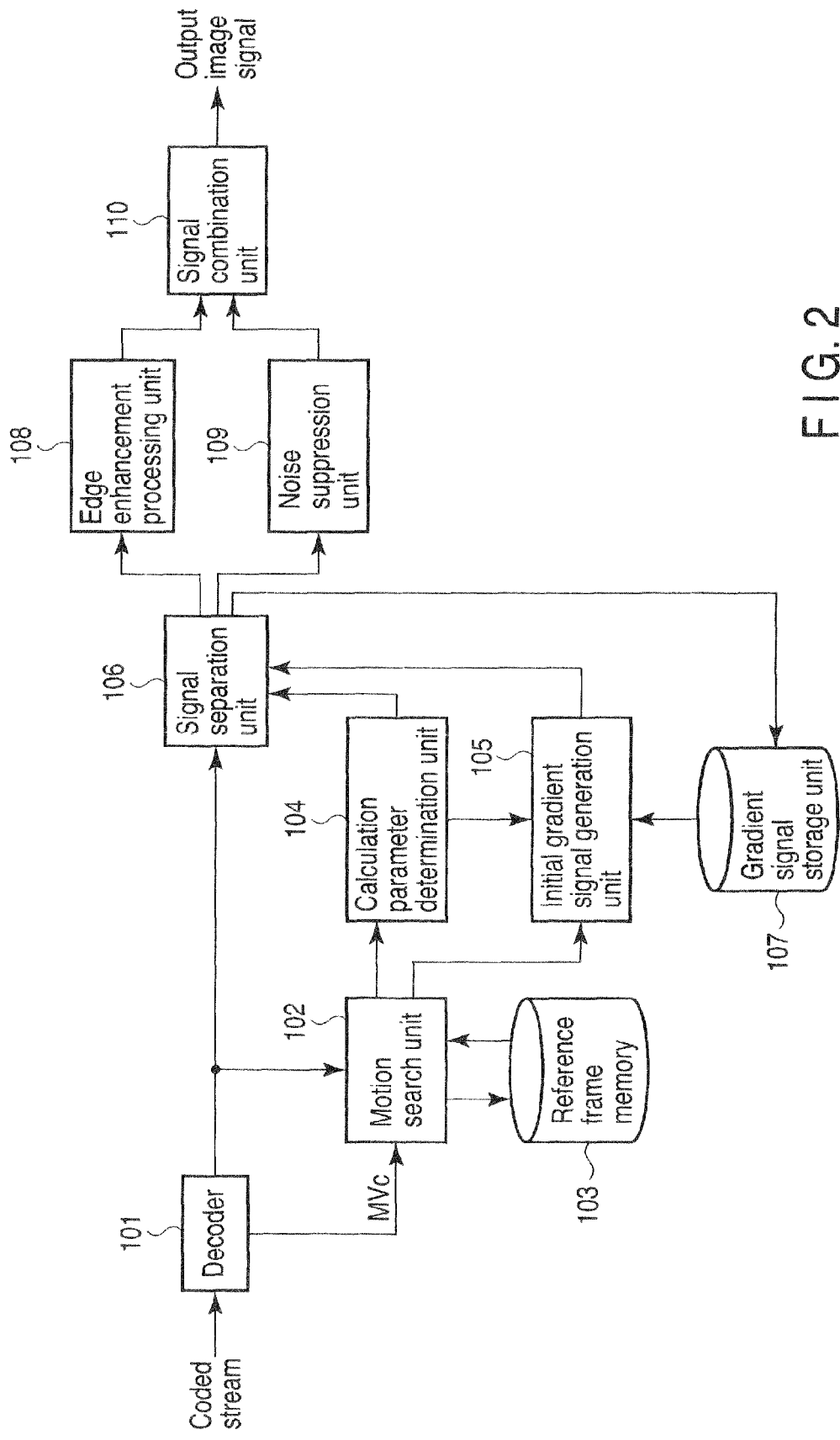
FIG. 2 is a block diagram showing an image processing device according to the first embodiment.

As shown in FIG. 2, an image processing device according to a first embodiment of the present invention comprises a decoder 101, a motion search unit 102, a reference frame memory 103, a calculation parameter determination unit 104, an initial gradient signal generation unit 105, a signal separation unit 106, a gradient signal storage unit 107, an edge enhancement processing unit 108, a noise suppression unit 109, and a signal combination unit 110.

A coded stream is input to the decoder 101 from a tuner or a file system, not shown. Frames coded according to a video coding technique such as MPEG-2, MPEG-4, H.264/AVC (hereinafter simply referred to as frames) are multiplexed into the coded stream. The decoder 101 performs a decoding process compliant with the coding technique used in coding the frames forming the moving picture to obtain a sequence of frames, and input the obtained frames to the motion search unit 102 and the signal separation unit 106. The frames obtained in the decoding process are represented by a YUV format or an RGB format, for example.

When an inter-frame motion compensation prediction process, in which a motion vector is used, is performed in the video coding technique, the motion vector is usually also coded and stored in the coded stream. Accordingly, the decoder 101 may input the motion vector (MVc), obtained by decoding the coded motion vector multiplexed into the coded stream, along with the frame to the motion search unit 102.

The motion search unit 102 performs a motion search process on the frame from the decoder 101. In this case, the motion search process is performed in units of blocks into which the frame has been divided in a predetermined block size (in a rectangular shape, for example). When a motion vector MVc is input from the decoder 101, the motion search unit 102 can use the block specified by the motion vector MVc as the center of search.

The motion search unit 102 selects an optimum motion vector MVt based on block matching between a reference block included in a predetermined motion search range, in which a block specified by the motion vector MVc from a reference frame read from the reference frame memory 103 is centered, and one of the blocks into which the decoded frame has been divided. In this block matching, cost values such as a sum of absolute differences (SAD) are sequentially calculated based on a predetermined cost function, and a motion vector MVt having the least cost value is selected. After the motion vector MVt and the cost value are thus determined, the motion search unit 102 inputs the motion vector MVt to the initial gradient signal generation unit 105, and the cost value to the calculation parameter determination unit 104. The reference frame may be a temporally preceding frame or subsequent frame. There may be only one reference frame or more than one reference frames.

When a motion vector MVc cannot be obtained from the decoder 101, the motion search unit 102 may search a motion vector MVt using the same position of a block to be processed as the center of search.

The frames are input to the reference frame memory 103 from the motion search unit 102, and are stored as reference frames referenced in the search of the motion search unit 102.

The calculation parameter determination unit 104 determines the number of iterations Iteration in the signal separation calculation performed by the signal separation unit 106, according to the cost value input from the motion search unit 102, and inputs the determined number of iterations Iteration to the signal separation unit 106. Further, the calculation parameter determination unit 104 determines a correlation index indicating strength of correlation between the frame and the reference frame according to the cost value input from the motion search unit 102, and notifies the initial gradient signal generation unit 105 of the determined correlation index. The number of iterations Iteration and the correlation index will be described in detail below.

The initial gradient signal generation unit 105 generates a gradient signal value (which is also called an oscillation generation function), which is used as an initial value in the signal separation calculation performed by the signal separation unit 106, and inputs the gradient signal value to the signal separation unit 106. More specifically, the gradient signal value which can be generated by the initial gradient signal generation unit 105 is a gradient signal value based on a motion vector MVt input from the motion search unit 102 or 0 (zero vector). The gradient signal will be described in detail below. The initial gradient signal generation unit 105 inputs one of the gradient signal value based on the motion vector MVt and 0 according to the correlation index notified by the calculation parameter determination unit 104. The gradient value based on the motion vector MVt means, for example, a gradient signal value corresponding to a block specified by the motion vector MVt in a temporally-previous gradient signal value stored in the gradient signal storage unit 107.

The signal separation unit 106 obtains a skeleton signal and a texture signal by performing signal separation calculation based on the TV method on a frame input from the decoder 101 to separate a signal component into the skeleton signal and the texture signal, based on the gradient signal value from the initial gradient signal generation unit 105 and the number of iterations Iteration from the calculation parameter determination unit 104. The signal separation unit 106 inputs the skeleton signal to the edge enhancement processing unit 108 and the texture signal to the noise suppression unit 109. The signal separation unit 106 inputs the gradient signal value calculated based on the number of iterations Iteration to the gradient signal storage unit 107. When the decoded image signal is in a YUV format, the signal separation unit 106 may perform a separation calculation only on a Y signal (luminance signal), about which human visual feature has a high discrimination sensitivity, to reduce the calculation amount.

Hereinafter, the signal separation calculation based on the TV method will be described in brief. Details about the signal separation calculation based on the TV method should be referred to the following document: "Journal of Mathematical Imaging and Vision 20:pp 89-97, 2004", A. Chmbolle.

A pixel value f (x, y) of a decoded image signal at coordinates (x, y) in an arbitrary frame, a skeleton component u (x, y) of the decoded image signal, and a texture component v (x, y) of the decoded image signal satisfy the following Equation (1):

$$f(x,y)=u(x,y)+v(x,y) \quad (1)$$

In Equation (1), assuming that u (x, y) is a signal formed of a uniform luminance area and an edge area, a reconstruction problem of u (x, y) from f (x, y) is formulated as a minimization problem of an energy functional in a bounded variation space BV. That is, the texture signal v (x, y) is derived from the following Equation (2):

$$v(x, y) = \lambda \cdot div(\vec{p}) \quad (2)$$

$$div(\vec{p}) = \begin{cases} p^1_{x,y} - p^1_{x-1,y} & \text{if } 0 < x < \text{width} - 1 \\ p^1_{x,y} & \text{if } x == 0 \\ -p^1_{x-1,y} & \text{if } x == \text{width} - 1 \end{cases} + \begin{cases} p^2_{x,y} - p^2_{x,y-1} & \text{if } 0 < y < \text{height} - 1 \\ p^2_{x,y} & \text{if } y == 0 \\ -p^2_{x,y-1} & \text{if } y == \text{height} - 1 \end{cases}$$

In Equation (2), the vector $\vec{p}$ is a gradient signal. The $p^1_{x,y}$ and $p^2_{x,y}$ denote an x component and a y component of the gradient signal value, respectively. The width and the height denote a width and a height of the frame, respectively. λ is a constant regarding separation calculation.

When the gradient signal value from the initial gradient signal generation unit 105 is 0, the signal separation unit 106 substitutes a zero vector into the initial value of the gradient signal value, as shown in the following Equation (3):

$$\vec{p}_{x,y}^{(0)} = \vec{0} \quad (3)$$

When the gradient signal value from the initial gradient signal generation unit 105 has been selected from the gradient signal storage unit 107 based on the motion vector MVt, the signal separation unit 106 substitutes the gradient signal value into the initial value.

A gradient signal value $\vec{p}^{(i+1)}$ obtained by iterating the signal separation calculation (i+1) times (where i is an arbitrary integer greater than or equal to 0) can be derived, based on the gradient signal value $\vec{p}^{(i)}$ obtained by iterating the signal separation calculation i times, by the following Equation (4):

$$\vec{p}_{x,y}^{(i+1)} = \frac{\vec{p}_{x,y}^{(i)} + \tau \cdot \{\nabla(div(\vec{p}_{x,y}^{(i)})) - f(x, y)/\lambda)\}_{x,y}}{1 + \tau \cdot |\{\nabla(div(\vec{p}_{x,y}^{(i)})) - f(x, y)/\lambda)\}_{x,y}|} \quad (4)$$

In Equation (4), τ is a constant regarding convergence. The signal separation unit 106 iteratively performs the calculation expressed by Equation (4) according to the number of iterations Iteration from the calculation parameter determination unit 104 to determine a gradient signal value $\vec{p}^{(Iteration)}$. The signal separation unit 106 determines a texture signal v (x, y) by substituting the gradient signal value $\vec{p}^{(Iteration)}$ into Equation (2) and a skeleton signal u (x, y) by substituting the texture signal v (x, y) into Equation (1).

The gradient signal value determined by the signal separation unit 106 is stored in the gradient signal storage unit 107 in units of frames, for example, and is read as appropriate by the initial gradient signal generation unit 105 as described above. The gradient signal value stored in the gradient signal storage unit 107 has x components and y components as described above. Each of the x components and the y components is managed in an arrangement corresponding to the positions of pixels forming a frame. That is, the x components and the y components are managed as a frame formed of the x components of the gradient signal value and a frame formed of the y components of the gradient signal value, respectively.

The noise suppression unit 109 performs a noise suppression process generally performed in image processing, such as a Gaussian filter process, a median filter process, an average filter process, and a soft decision threshold process, and inputs a texture signal subjected to the noise suppression process to the signal combination unit 110. In implementing the image processing device according to the present embodiment, the noise suppression process by the noise suppression unit 109 may be selectively executed/omitted, the noise suppression process to be executed may be switched, or the noise suppression process 109 may be removed.

The edge enhancement processing unit 108 performs an edge enhancement process on the skeleton signal from the signal separation unit 106. The edge enhancement process is generally used in image processing such as Laplacian filter processing and Sobel filter processing. After that, the edge enhancement processing unit 108 inputs the skeleton signal subjected to the edge enhancement process to the signal combination unit 110. In implementing the image processing device according to the present embodiment, the edge enhancement process by the edge enhancement processing unit 108 may be selectively executed/omitted, the edge enhancement process to be executed may be switched, or the edge enhancement unit 108 may be removed.

The signal combination unit 110 combines the skeleton signal from the edge enhancement processing unit 108 and the texture signal from the noise suppression unit 109, and generates a frame to be output. The frame to be output is displayed on a display unit controlled by a display control unit, not shown.

Figure 3:
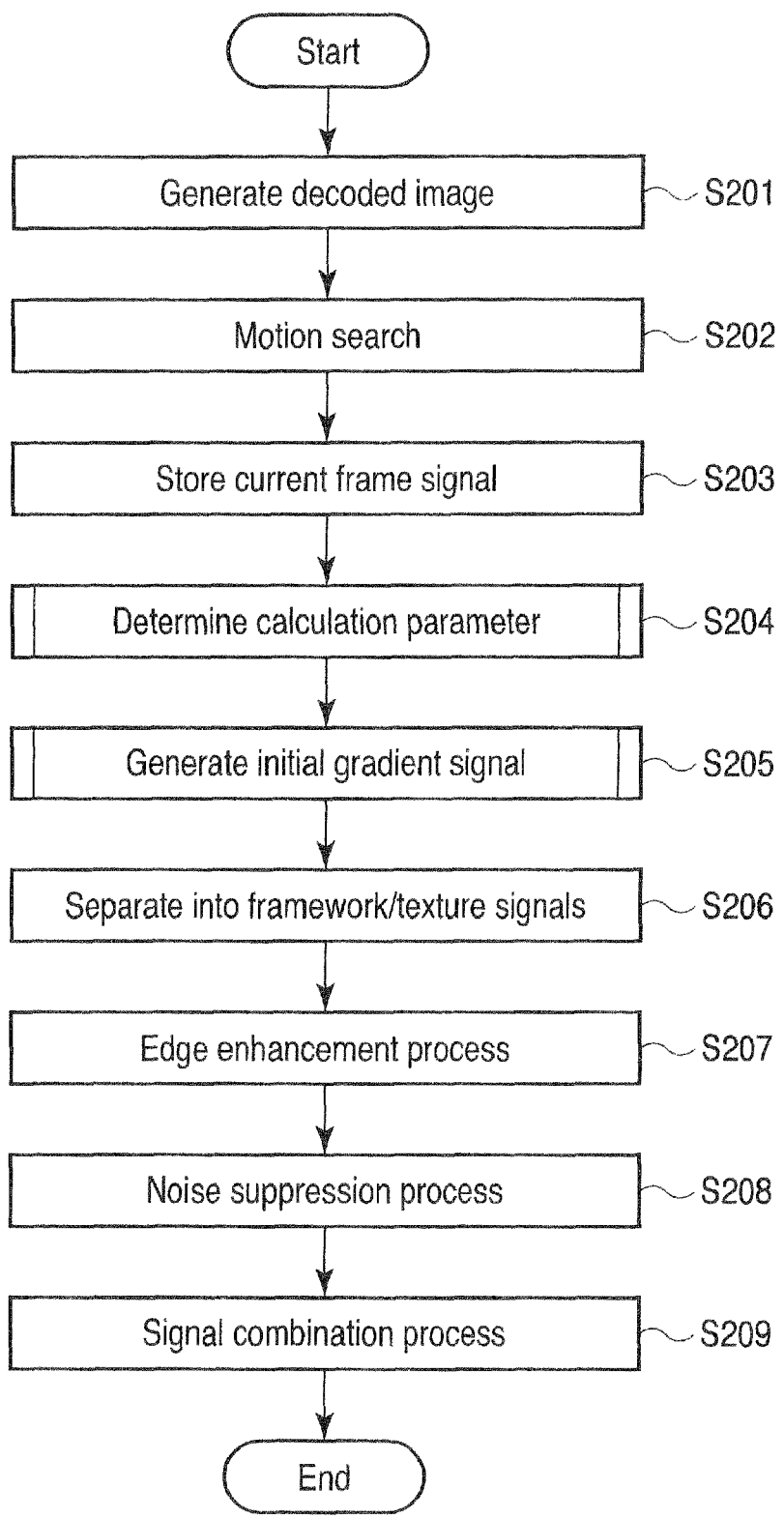
FIG. 3 is a flowchart showing the processes performed by the image processing device shown in FIG. 2.

Hereinafter, operations of the image processing device of FIG. 2 will be described with reference to FIG. 3.

First, the decoder 101 decodes an input coded stream, generates a frame and a motion vector MVc (step S201), and inputs the frame to the motion search unit 102 and the signal separation unit 106, and inputs the motion vector MVc to the motion search unit 102. Each of the pixel values of the frame generated by the decoder 101 is expressed by f (t, x, y), where t denotes a temporal position (such as a frame number) of the frame and x and y denote spatial positions (such as coordinates corresponding to t in a frame in a width direction and a height direction, respectively) of the pixel.

Second, the motion search unit 102 generates a block B (m, n) by dividing the frame in a predetermined block size, performs a motion search process based on the block B (m, n), and determines an optimum motion vector MVt and a cost value for the block B (m, n) (S202). The values m and n in the block B (m, n) indicate positions of the block in the frame in a width direction and a height direction, respectively.

As an example of a concrete aspect of the motion search process in step S202, the approach disclosed in Document "H.264/AVC Kyoukasho [Textbook]", published by Impress Japan, is applicable. More specifically, the motion search unit 102 searches a reference block in which the predetermined cost function is the minimum based on the reference block extracted from the reference frame and the block B (m, n) extracted from the frame. Thereby, the motion search unit can determine the spatial shift amount between these blocks as an optimum motion vector MVt. Further, the motion search unit 102 inputs the minimum value of the cost function, that is, the cost value corresponding to the optimum motion vector MVt, to the calculation parameter determination unit 104.

The motion search unit 102 can use the weighted sum of the differential value between the block B (m, n) and the reference block and the differential value between the motion vector of the block B (m, n) and the motion vector of each of the blocks adjacent to the block B (m, n) as a cost function.

The differential value between the block B (m, n) and the referential block is a sum of absolute differences (SAD) or a sum of square differences (SSD) between the block B (m, n) to be processed and the referential block specified by a motion vector candidate MV determined by the motion vector MVt from the reference frame. The differential value between the motion vector of the block B (m, n) and the motion vector of the block adjacent to the block B (m, n) is, for example, a differential sum of the motion vector candidate MV and the motion vector of each of the blocks adjacent to the image signal B (m, n) of the block to be processed on the left side and the upper side. As the cost function, the following Equation (5) can be used, for example:

$$Cost = SAD(MV) + \lambda \cdot Diff(MV) \quad (5)$$

In Equation (5), SAD (MV) denotes a SAD between the block B (m, n) and the reference block specified by the motion vector candidate MV from the reference frame. Further, Diff (MV) denotes a differential sum between the motion vector candidate MV and the motion vector of each of the blocks adjacent to the block B on the left side and on the upper side. Further, $\lambda$ denotes a weighting factor. The motion search unit 102 inputs a cost value Cost (m, n) corresponding to the optimum motion vector MVt to the calculation parameter determination unit 104.

From the viewpoint of the calculation amount, the motion vector candidate MV is usually limited to a one which specifies blocks included in the search range, which is based on the search center, in the reference frame. The search center may be a block in the same position as that of the block B (m, n), or the block specified by a motion vector MVc if the motion vector MVc regarding the block B (m, n) is obtained in step S201.

In the above example, the motion search unit 102 has been described as performing the process in units of rectangular blocks, but the motion search process on an image signal of an arbitrary shape may be performed through an approach such as warping prediction.

In parallel with the search process, the motion search unit 102 stores a frame received from the decoder 101 in the reference frame memory 103 (step S203).

Next, the calculation parameter determination unit 104 determines the number of iterations Iteration and a correlation index based on the cost value Cost (m, n) determined in step S202 (step S204). The process in step S204 will be described in detail later.

Next, the initial gradient signal generation unit 105 generates a gradient signal value based on the correlation index determined in step S204 (step S205). The process in step S205 will be described in detail below.

Next, the signal separation unit 106 performs a signal separation calculation on the frame from the decoder 101 based on the TV method, according to the gradient signal value generated in step S205 and the number of iterations Iteration determined in step S204, to separate the signal into signal components (step S206).

Next, the edge enhancement processing unit 108 performs an edge enhancement process on a skeleton signal into which the signal has been separated in step S206 (step S207). The noise suppression unit 109 performs a noise suppression process on the texture signal into which the signal has been separated in step S206 (step S208). One of the processes in steps S207 and S208 may be omitted.

Next, the signal combination unit 109 combines the skeleton signal subjected to the edge enhancement process in step S207 and the texture signal subjected to the noise suppression process in step S208 and generates an output image signal (step S209). Thereby, the process ends.

Hereinafter, the determination process of the number of iterations Iteration performed by the calculation parameter 104 according to the present embodiment will be described with reference to FIG. 4.

First, an accumulative value (total sum) sumCost of Cost (m, n) corresponding to each of the blocks B (m, n) obtained by dividing a frame being processed is calculated (step S301). The value sumCost correlates to a residual between the frame and the reference frame. Accordingly, occurrence or nonoccurrence of scene change between the frame and the reference frame can be determined based on the amount of sumCost.

Second, sumCost calculated in step S301 and a threshold TH_sc for determining occurrence or nonoccurrence of scene change are compared (step S302). A value determined empirically/experimentally is set as the threshold TH_sc. In step S302, if sumCost is greater than TH_sc, the process proceeds to step S303, and if not, to step S305.

If the detection result shows that sumCost is greater than the threshold TH_sc in step S302, TRUE is substituted into a flag ScFlag indicating the determination result of the scene change in step S303. The flag ScFlag is a correlation index as will be described below, and is used to generate a gradient signal value.

Next, the calculation parameter determination unit 104 substitutes M into the number of iterations Iteration (step S304), and thereby the process ends. The value M may be an arbitrary natural number, but preferably a value obtained empirically/experimentally should be set as the value M such that the signal separation calculation based on the TV method can be performed with desired precision when the initial value of the gradient signal value is 0.

When the detection result shows that sumCost is smaller than the threshold TH_sc in step S302, FALSE is substituted into the flag ScFlag in step S305, and N is substituted as the number of iterations Iteration (step S306). Thereby, the process ends. The value N is an arbitrary natural number smaller than M. Since the texture signal is known as having strong temporal correlation, in the nonoccurrence of scene change, high separation precision can be achieved by using the gradient signal value in a processed texture signal as an initial value even by decreasing the number of iterations. A value obtained empirically/experimentally should preferably be set as N such that the signal separation calculation based on the TV method can be performed with desired precision when the initial value of the gradient signal value is generated using an optimum motion vector MVt (m, n) regarding the block B (m, n).

Next, the generation process of the gradient signal value determined by the initial gradient signal generation unit 105 according to the present embodiment will be described with reference to FIG. 5.

First, determination is performed as to whether the value of ScFlag corresponding to the frame being processed received from the calculation parameter determination unit 104 is TRUE or FALSE (step S401). If ScFlag is TRUE, 0 is set as the initial gradient signal (step S402), and thereby the process ends. When ScFlag is FALSE, a gradient signal value corresponding to the block specified by the motion vector MVt (m, n) from the gradient signal value eventually generated in the temporally previous frame is set as the initial gradient signal, using the optimum motion vector MVt for each of the block image signals B (m, n) into which a frame has been divided (step S403). Thereby, the process ends.

As described above, the image processing device according to the present embodiment determines a flag ScFlag indicating occurrence or nonoccurrence of scene change as a correlation index indicating strength of correlation between the frame being processed and the reference frame, and switches the initial value generation manner in the signal separation calculation based on the TV method according to the correlation index. According to the image processing device of the present embodiment, if the correlation is strong (i.e., if the determination shows nonoccurrence of scene change), a gradient signal value calculated in an image region having a strong correlation which exists in the past can be used as the initial value, and thereby the number of iterations can be decreased, maintaining precision of the signal separation calculation.

Figure 1:
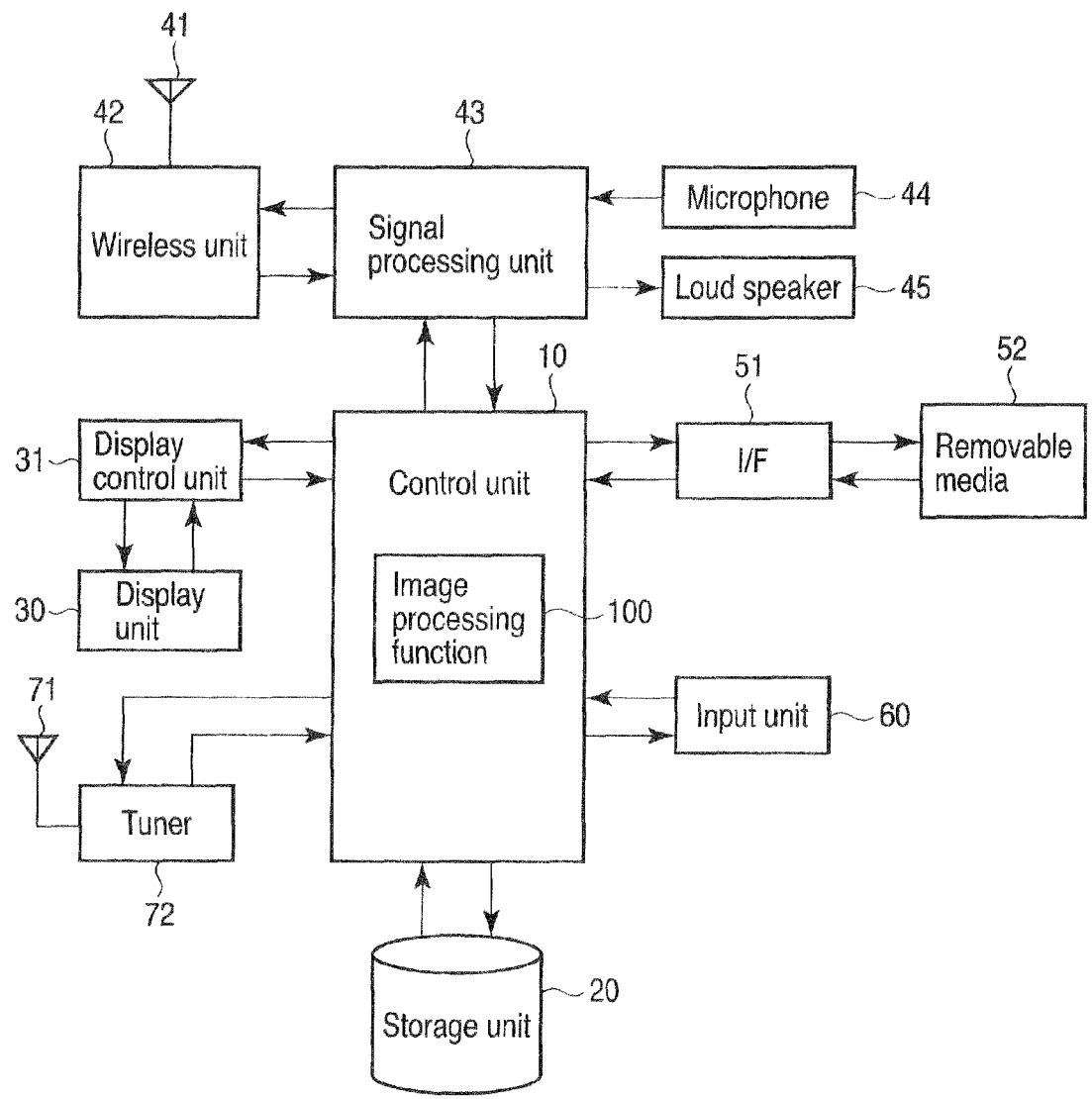
FIG. 1 is a block diagram showing an example of a hardware configuration of an image processing device according to a first embodiment.

Further, the image processing device according to the present embodiment can be implemented by the hardware configuration shown in FIG. 1, for example, integrally formed with a computer terminal having an image playback function, such as a cellular phone, a personal computer, or a data communication terminal.

A wireless unit 42 operates according to an instruction from the controlling unit 10, upconverts a transmission signal output from a signal processing unit 43 to a radio frequency band. After that, the wireless unit 42 transmits the transmission signal by radio to a base station apparatus provided in a mobile communication network, not shown, via an antenna 41, or receives the transmission signal output from the base station device via the antenna 41 and downconverts the transmission signal to a baseband signal.

The signal processing unit 43 operates according to an instruction from the controlling unit 10, and converts a voice signal input from a microphone 44 to transmission data. After that, the signal processing unit 43 generates the transmission signal in which a carrier signal is modulated based on the transmission data, or obtains reception data by demodulating the baseband signal input from the wireless unit 42 and outputs the voice signal obtained by decoding the reception data via a loudspeaker 45.

A display control unit 31 controls drive of a display unit 30 in which display devices such as a liquid crystal display (LCD) and an organic electroluminescence (EL) display are used, according to an instruction from the control unit 10, and displays an image signal based on the display data given from the control unit 10 on the display unit 30. For example, the output image signal is displayed on the display unit 30 as an example of the display data.

An input unit 60 is a user interface which accepts a request from the user using an input device such as a plurality of key switches (numeric keypads, for example) and a touchpad.

An interface (I/F) 51 is an interface for physically and electrically connecting a removable media 52 for data exchange, and is controlled by the control unit 10. A removable media 52 may store a coded stream in which an image signal to be processed by an image processing function 100 of the control unit 10 is coded and multiplexed.

A tuner 72 receives a television broadcast signal transmitted from a broadcast station, not shown, via the antenna 71, and obtains a coded stream stored in the broadcast signal. In the coded stream, the image signal to be processed by the image processing function 100 of the control unit 10 is coded and multiplexed.

The storage unit 20 is a storage medium such as a random access memory (RAM) or a read-only memory (ROM), and stores data of various kinds generated by the user and control data regarding the removable media 52. A storage unit 20 may store a coded stream in which an image signal to be processed by the image processing function 100 of the control unit 10 is coded and multiplexed. In the storage unit 20, a program for operating the control unit 10 as the image processing function 100 is stored, and the control unit 10 implements the image processing function 100 by executing the program. The storage unit 20 may be used as the reference frame memory 103 and the gradient signal storage unit 107 when the control unit 10 operates as the image processing function 100.

The control unit 10 includes a processor such as a central processing unit (CPU), and collectively controls the structural elements shown in FIG. 1. The control unit 10 has, for example, a communication control function of implementing various types of communication such as a voice communication. The control unit 10 has the image processing function 100, which implements various processes with reference to the structural elements of the image processing device according to the present embodiment.

Second Embodiment

The image processing device according to the second embodiment of the present invention is different from the image processing device according to the first embodiment in the calculation parameter determination process. In the descriptions that follow, the structural elements same as those described in the first embodiment will be denoted by the same reference numbers, and different elements will be mostly discussed.

Figure 6:
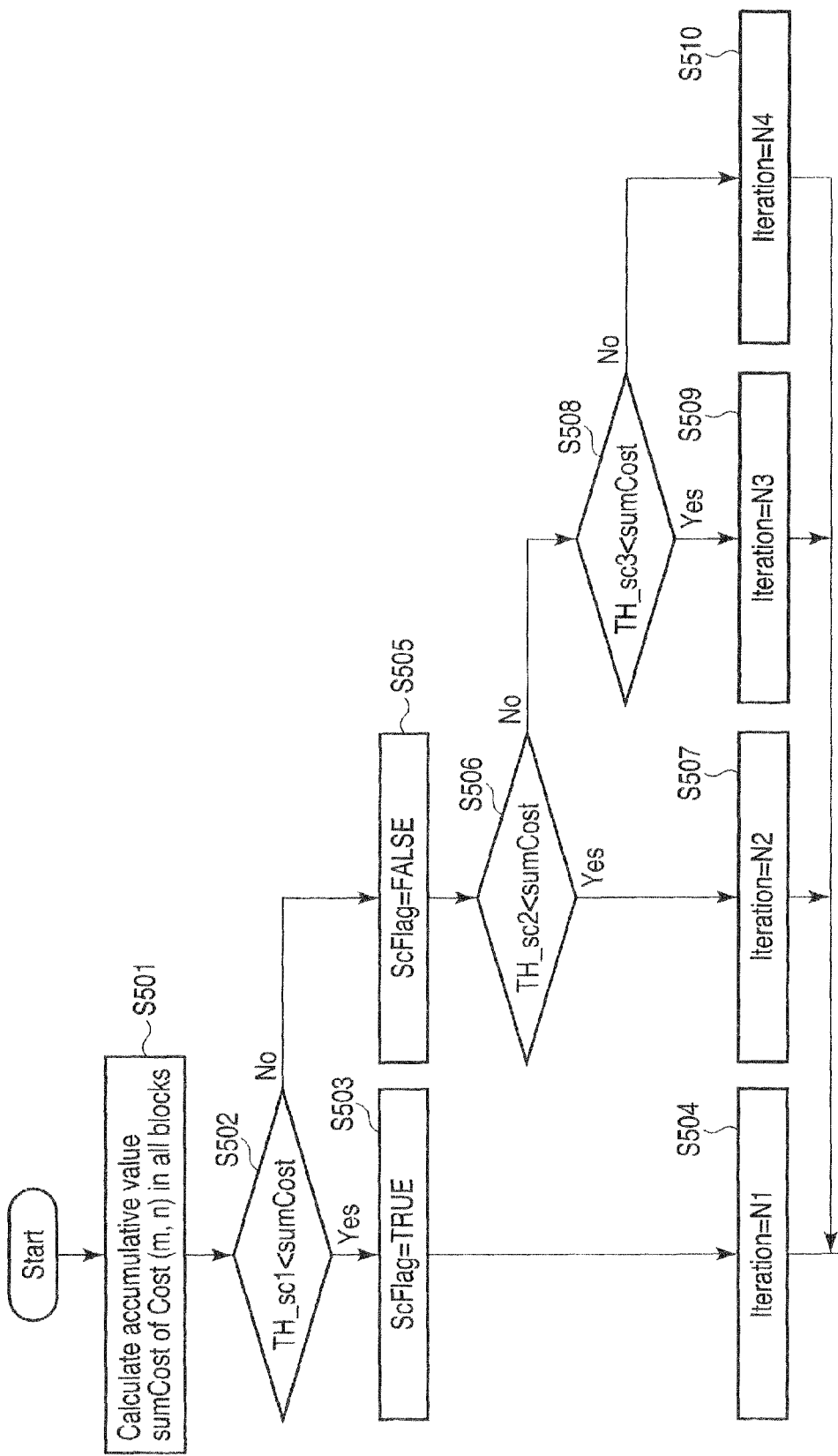
FIG. 6 is a flowchart showing a determination process of a calculation parameter according to a second embodiment.

Hereinafter, the determination process of the calculation parameter according to the present embodiment will be described with reference to FIG. 6.

First, the calculation parameter determination unit 104 calculates an accumulative value (total sum) sumCost of Cost (m, n) corresponding to each of the blocks B (m, n) into which the frame obtained from the decoder 101 has been divided (step S501).

After that, the calculation parameter determination unit 104 compares sumCost calculated in step S501 and the threshold TH_sc1 (step S502). The threshold TH_sc1 is a threshold value for determining occurrence/nonoccurrence of scene change, and a value obtained empirically/experimentally is set as TH_sc1. In step S502, if sumCost is greater than TH_sc1, the process proceeds to step S503, and if not, to step S505.

If the detection result in step S502 shows that sumCost is greater than the threshold TH_sc1, the calculation parameter determination unit 104 substitutes TRUE into the flag ScFlag (step S503). After that, the calculation parameter determination unit 104 substitutes N1 into the number of iterations (step S504), and thereby the process ends. The value N1 may be an arbitrary natural number, but preferably a value obtained empirically/experimentally should be set as N1 such that the signal separation calculation based on the TV method can be performed with desired precision when the initial value of the gradient signal value is set as 0.

If the detection result in step S502 shows that sumCost is smaller than the threshold value TH_sc1, the calculation parameter determination unit 104 substitutes FALSE into the flag ScFlag (step S505). After that, the calculation parameter determination unit 104 compares sumCost calculated in step S501 with the threshold value TH_sc2 (step S506). As the threshold TH_sc2, a value smaller than the threshold TH_sc1 and obtained empirically/experimentally is set. If sumCost is greater than TH_sc2 in step S506, the process proceeds to step S507, and if not, to step S508.

If the detection result in step S506 shows that sumCost is greater than the threshold TH_sc2, the calculation parameter determination unit 104 substitutes N2 into the number of iterations Iteration (step S507), and thereby the process ends. The value N2 is an arbitrary natural number smaller than N1. Further, a value obtained empirically/experimentally should preferably be set as N2 such that the signal separation calculation based on the TV method can be performed with desired precision when the initial value of the gradient signal value is generated using an optimum motion vector MVt (m, n) regarding the block B (m, n).

When the detection result in step S506 shows that sumCost is smaller than the threshold value TH_sc2, the calculation parameter determination unit 104 compares sumCost calculated in step S501 and the threshold value TH_sc3 (step S508). As the threshold value TH_sc3, a value smaller than the threshold TH_sc2 and obtained empirically/experimentally is set. If sumCost is greater than TH_sc3 in step S508, the process proceeds to step S509, and if not, to step S510.

If the detection result in step S508 shows that sumCost is greater than the threshold value TH_sc3, the calculation parameter determination unit 104 substitutes N3 into the number of iterations Iteration (step S509), and the process ends. The value N3 is an arbitrary natural number smaller than N2, and a value obtained empirically/experimentally is set as N3. If the detection result in step S508 shows that sumCost is smaller than the threshold value TH_sc1, the calculation parameter determination unit 104 substitutes N4 into the number of iterations Iteration (step S510), and thereby the process ends. As N4, any arbitrary natural number smaller than N3 and obtained empirically/experimentally is set.

As explained above, in the image processing device according to the present embodiment, a plurality of thresholds to be compared with sumCost are provided, and the number of iterations Iteration is switched between four values. Accordingly, according to the image processing device of the present embodiment, an appropriate number of iterations Iteration can be set according to the strength of correlation between a frame being processed and a reference frame, and thereby the calculation amount of the signal separation calculation based on the TV method can be effectively eliminated. The number of iterations Iteration has been described above as being switchable between four values, but can be set as being switchable between an arbitrary number of values as a matter of course.

Third Embodiment

The image processing device according to the third embodiment of the present invention is different from the image processing device according to the first and second embodiments in the determination process of the calculation parameter and the signal separation calculation. In the descriptions that follow, the structural elements same as those described in the first and second embodiments will be denoted by the same reference numbers and different elements will be mostly discussed.

In the calculation parameter determination process by the calculation parameter determination unit 104 according to the present embodiment, the number of iterations Iteration is determined in units of blocks such as macro blocks, instead of frames. Since the determination process of the number of iterations Iteration in units of blocks can be performed as appropriate by a person with ordinary skill in the art based on the above-given description about the determination process of the number of iterations Iteration in units of frames, concrete descriptions will be omitted herein.

Hereinafter, the signal separation calculation according to the present embodiment will be described with reference to FIG. 7.

First, the signal separation unit 106 substitutes a maximum value of the number of iterations Iteration (m, n) set in each of blocks B (m, n), into which a frame obtained from the decoder 101 has been divided, into a variable IterationNum (step S601), and the process proceeds to step S602. The target of the processes after step S601 is each of blocks B (m, n). The processing order does not matter. The signal separation unit 106 shifts the blocks B (m, n) according to a raster order, for example.

The signal separation unit 106 determines whether the number of iterations Iteration (m, n) set in the block B (m, n) currently being processed agrees with the value of a variable IterationNum (step S602). If the number of iterations Iteration (m, n) agrees with the variable IterationNum, the process proceeds to step S603, and if not, to step S605.

Upon determination in step S602 that the number of iterations Iteration (m, n) agrees with the value of the variable IterationNum, the signal separation unit 106 performs only one signal separation calculation based on the TV method on a block B (m, n) currently being processed only once (step S603). The signal separation unit 106 decrements the number of iterations assigned to the current block B (m, n) by one (step S604), and the process proceeds to step S605.

Upon determination in step S602 that the number of iterations Iteration (m, n) disagrees with the variable IterationNum, the signal separation unit 106 determines whether the current block B (m, n) currently being processed is a terminal block or not (step S605). Terminal blocks are different according to the processing order followed by the signal separation unit 106. If the processing order is the raster order, the block in the bottom right corner in a frame being processed is a terminal block. If this block B (m, n) is a terminal block, the process proceeds to step S608, and if not, to step S607. In step S607, the signal separation unit 106 shifts the target of the process to a next block according to a predetermined processing order, and the process returns to step S602.

If the detection result in step S605 shows that the block is a terminal block, the signal separation unit 106 decrements the variable IterationNum by one (step S608). After that, the signal separation unit 106 determines whether the variable IterationNum agrees with 0 (step S609). If the variable IterationNum agrees with 0, the process ends, and if not, to step S610. Upon determination in step S609 that the variable IterationNum agrees with 0, the signal separation unit 106 shifts the target of the process to a head block according to a predetermined processing order, and the process returns to step S602. If the processing order is the raster order, the block in the top left corner is a head block.

As described above, the image processing device according to the present embodiment determines the number of iterations Iteration in units of blocks, instead of frames, and signal separation calculation is performed once in units of blocks such that the residual of the number of iterations allocated to each block is smoothed. Therefore, according to the image processing device of the present embodiment, the calculation amount of the signal separation calculation based on the TV method can be decreased by improving efficiency of allocation of the number of iterations. Moreover, the block distortion which can happen due to the signal separation calculation performed in units of blocks can be decreased.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

For example, in the above-described embodiments, in the determination process of the calculation parameter, the sum total sumCost of Cost (m, n) is used as an evaluation value, but a total absolute value of a discrete cosine transform (DCT) coefficient of the block B (m, n) may be used as the evaluation value. If the block B (m, n) is a block which is not based on an inter-frame motion compensation prediction process such as IntraMB, the maxim number of iterations (M or N1, for example) may be given.

It will be obvious that various changes may be made without departing from the scope of the invention.

What is claimed is:

1. An image processing device comprising:
a decoder which decodes a coded stream into which a coded frame is multiplexed and obtains a decoded frame;
a storage unit configured to store a reference frame;
a motion search unit configured to perform a motion search process on the decoded frame and determine a motion vector between the decoded frame and the reference frame stored in the storage unit;
a determination unit configured to determine a correlation value between the decoded frame and the reference frame and the number of iterations indicating the number of times signal separation calculation based on a TV method is iteratively performed on the decoded frame, based on a result of the motion search process;
a generation unit configured to generate, as an initial gradient signal value, a zero vector or a gradient signal value obtained based on the motion vector determined in the motion search process, according to the correlation value;
a separation unit configured to iteratively perform the signal separation calculation on the decoded frame the number of iterations, using the initial gradient signal value as an initial value, and separate the decoded frame into a first skeleton image signal and a first texture image signal;
an image processing unit configured to perform at least one of an edge enhancement process on the first skeleton image signal and a noise suppression process on the first texture image signal and obtain a second skeleton image signal aid a second texture image signal; and
a combination unit configured to combine the second skeleton image signal and the second texture image signal to generate a frame to be output.

2. The device according to claim 1, wherein, the determination unit determines the correlation value and the number of iterations according to a result of comparison between an evaluation value, which is based on a difference between the decoded frame and the reference frame, and a threshold.

3. The device according to claim 1, wherein, the determination unit determines the number of iterations based on the correlation value such that the number of iterations decreases as strength of correlation increases.

4. The device according to claim 1, wherein
the determination unit determines the correlation value and the number of iterations in units of blocks into which the decoded frame has been divided, and
the separation unit sequentially performs the signal separation calculation the blocks such that residue a of the number of iterations allocated to each of the blocks is smoothed.

5. A computer terminal comprising:
a storage unit;
a processor which operates as:
means for decoding a coded stream into which a coded frame is multiplexed and obtaining a decoded frame;
means for storing a reference frame in the storage unit;
means for performing a motion search process on the decoded frame and determining a motion vector between the decoded frame and the reference frame stored in the storage unit;
means for determining a correlation value indicating strength of correlation between the decoded frame and the reference frame, and the number of iterations indicating the number of times signal separation calculation based on a TV method is performed on the decoded frame, based on a result of the motion search process;
means for generating a zero vector or a gradient signal value obtained based on the motion vector determined in the motion search process as an initial gradient signal value, according to the correlation value;
means for iteratively performing the signal separation calculation on the decoded frame the number of iterations using the initial gradient signal value as an initial value, and separating the decoded frame into a first skeleton image signal and a first texture image signal;
means for performing at least one of an edge enhancement process on the first skeleton image signal and a noise suppression process on the first texture image signal and obtaining a second skeleton image signal and a second texture image signal; and
means for combining the second skeleton image signal and the second texture image signal and generating a frame to be output, and
a display unit configured to display the frame to be output.

6. The terminal according to claim 5, wherein, the processor operates as: means for determining the correlation value and the number of iterations according to a result of comparison between an evaluation value, which is based on a difference between the decoded frame and the reference frame, and a threshold.

7. The terminal according to claim 5, wherein, the processor operates as: means for determining the number of iterations based on the correlation value such that the number of iterations decreases as strength of correlation increases.

8. The terminal according to claim 5, wherein the processor operates as:
means for determining the correlation value and the number of iterations in units of blocks into which the decoded frame has been divided, and
means for sequentially performing the signal separation calculation on the blocks such that residual of the number of iterations allocated to each of the blocks is smoothed.

9. A signal separation method comprising:
decoding a coded stream into which a coded frame is multiplexed and obtaining a decoded frame;
performing a motion search process on the decoded frame and determining a motion vector between the decoded frame and a reference frame;
determining occurrence or nonoccurrence of scene change between the decoded frame and the reference frame;
determining the number of iterations indicating the number of times signal separation calculation based on a TV method is iteratively performed on the decoded frame, based on the occurrence or nonoccurrence of the scene change;

generating, as an initial gradient signal value, a zero vector or a gradient signal value obtained based on the motion vector determined in the motion search process, according to the occurrence or nonoccurrence of the scene change; and iteratively performing the signal separation calculation on the decoded frame the number of iterations, using the initial gradient signal value as an initial value, and separating the decoded frame into a skeleton image signal and a texture image signal.

10. The method according to claim 9, wherein determining a first value as the number of iterations if the occurrence of the scene change has been determined, and a second value smaller than the first value as the number of iterations if the nonoccurrence of the scene change has been determined.

11. The method according to claim 9, wherein, generating the zero vector as the initial gradient signal value if the occurrence of the scene change has been determined, and the gradient signal value obtained based on the motion vector determined in the motion search process as the initial gradient signal value if the nonoccurrence of the scene change has been determined.

* * * * *